United States Patent [19]

Kocsányi et al.

[11] 4,088,579
[45] May 9, 1978

[54] PROCESS AND EQUIPMENT FOR THE THICKENING OF SLURRIES

[75] Inventors: László Kocsányi, Budapest; Lajos Varga, Eger; Márton Kovács; Ferenc Takáts, both of Budapest; György Kalo, Eger, all of Hungary

[73] Assignee: Heves Megyei Tanacsi Epitoipari Vallalat, Eger, Hungary

[21] Appl. No.: 779,163

[22] Filed: Mar. 18, 1977

Related U.S. Application Data

[63] Continuation of Ser. No. 614,633, Sep. 18, 1975, abandoned.

[30] Foreign Application Priority Data

Sep. 20, 1974 Hungary .......................... KO 2679

[51] Int. Cl.² .................... B01D 23/24; B01D 35/12
[52] U.S. Cl. ................................. 210/82; 210/108; 210/333 R; 210/341; 210/411
[58] Field of Search ................ 210/73 R, 73 SG, 76, 210/79, 81, 82, 108, 333, 332, 323 T, 333.1, 340, 341, 411

[56] References Cited

U.S. PATENT DOCUMENTS

| | | | |
|---|---|---|---|
| 786,441 | 4/1905 | Hunt | 210/332 |
| 1,359,162 | 11/1920 | Genter | 210/333.1 |
| 1,452,151 | 4/1923 | Genter | 210/323 |
| 1,706,400 | 3/1929 | Diamond | 210/323 T |
| 1,716,040 | 6/1929 | Genter | 210/333.1 |
| 1,724,436 | 8/1929 | Sweetland | 210/323 T |
| 1,734,999 | 11/1929 | Cruickshank | 210/411 |
| 2,468,603 | 4/1949 | Pew | 210/340 |
| 2,568,085 | 9/1951 | Naugle | 210/341 |
| 2,747,741 | 5/1956 | Jacobson | 210/411 |
| 2,921,686 | 1/1960 | Forman | 210/323 T |
| 3,043,431 | 7/1962 | Dudley et al. | 210/108 |
| 3,280,980 | 11/1966 | King | 210/108 |
| 3,317,048 | 5/1967 | Kasten | 210/323 T |
| 3,326,381 | 6/1967 | Fuller | 210/332 |
| 3,356,215 | 12/1967 | Miles | 210/333.1 |
| 3,397,784 | 8/1968 | Carr | 210/108 |
| 3,512,644 | 5/1970 | Nash | 210/108 |
| 3,744,633 | 1/1971 | Schmidt | 210/333 |
| 3,929,639 | 12/1975 | Turner | 210/340 |

FOREIGN PATENT DOCUMENTS

724,497 6/1953 United Kingdom ................ 210/356

Primary Examiner—Charles N. Hart
Assistant Examiner—Ernest G. Therkorn
Attorney, Agent, or Firm—Michael J. Striker

[57] ABSTRACT

Slurry to be densified by removal of water is passed into an inlet of a housing, through the housing, and out an outlet. Inside the housing are a plurality of elongated hollow filter elements, which extend in the direction of flow of the slurry. Water in the slurry passes through the walls of and into the interiors of the hollow filter elements, as the slurry flows along the lengths of the filter elements. The cross-sectional area of the flow space for the slurry, defined between the exterior surfaces of the filter elements and the interior wall of the housing, decreases as one proceeds along the lengths of the filter elements. As a result, the flow speed of the slurry does not decrease proceeding in the flow direction, but instead is maintained at least substantially constant, or is even caused to increase (accelerating flow). Accordingly, the densified slurry flowing along the exterior surfaces of the filter elements, because its flow speed is constant or even increasing instead of decreasing can wash away solid particles which would otherwise tend to accumulate on the exterior surfaces of the filter elements.

10 Claims, 4 Drawing Figures

PROCESS AND EQUIPMENT FOR THE THICKENING OF SLURRIES

This is a continuation, of application Ser. No. 614,633, filed Sept. 18, 1975, now abandoned.

The problem of concentrating slurries or foot or liquids containing granular solid matter occurs in numerous industrial processes. One of these is the area of hydraulic conveyors. The concentration of the slurry influences the cost considerably in particular if it to be conveyed over longer distances or to greater heights, i.e. cases of conveyors operating at high pressures and using several stages.

Most of the plants used in industry, for the concentration of slurries seek to achieve a concentration of the solid phase in a portion of the carrying liquid either by settling — utilizing the difference between the specific gravity of the solid matter and the liquid — or by methods exploiting other forces which affect the solid particles and the liquids to a different extent. These methods are generally speaking quite effective in the bigger particle size range, but their efficiency decreases with particlesize. A further disadvantage of such plants for thickening slurries is that the slurry introduced is divided into two parts, namely the thickened slurry and impure water. The latter must undergo further mechanical purification before it can be drained into the open or used further in the technological process.

In order to satisfy requirements of purity the liquid may be passed through filters. The solid material in the slurry collects on the filter surfaces in these cases, however, leading to a quick blocking of the filters particularly when used in the cases of more concentrated slurries. The filters are usually cleaned by flushing backward. This requires switching the filters in question out of operation and some other switch-overs, thus making the economical use of such plants impossible for thicker slurries because of the frequent blockages.

In order to eliminate the disadvantages described the method of filtration is employed for the thickning of the slurry in the present invention in such a way that either the rate of flow is sufficient on the side of the slurry for the removal of the particles intercepted by the filters, which means that the plant purifies itself, making a flush-back very infrequently if at all necessary, or the filters are so arranged in groups that only one group needs to be flushed back at a time while the other groups can continue to function undisturbed and so the operation of the whole plant is continuous. The two methods may be applied simultaneously, i.e. the plant may purify itself and at the same time it may be divided into groups as described.

Pure water may thus be obtained from the slurry by filtration which may be drained into rivers or lakes without further treatment, or used otherwise, and yet the plant operates continuously, either through self-purification or because only one group of filters needs to be purified by flushing back at any one time even when treating thick slurries. The filter elements employed in the present invention may be of several different designs. The best filter elements are those made of a perforated metal tube surrounded on the outside by a cloth or of a ceramic tube which are usually called filter plugs.

The plant for thickening slurries, described in the present invention may be applied in a wide area due to its design and operational properties which offer economical and ecological advantages. The area of hydraulic conveyance may be mentioned specially where the application of a filter plant improves the economy to such an extent that it becomes competitive to other conveyance techniques. In such cases the slurry condenser becomes that element of a complex plant which is of decisive importance from an economic point of view.

Further details of the invention will be explained with reference to the appended drawings.

Figure 1:
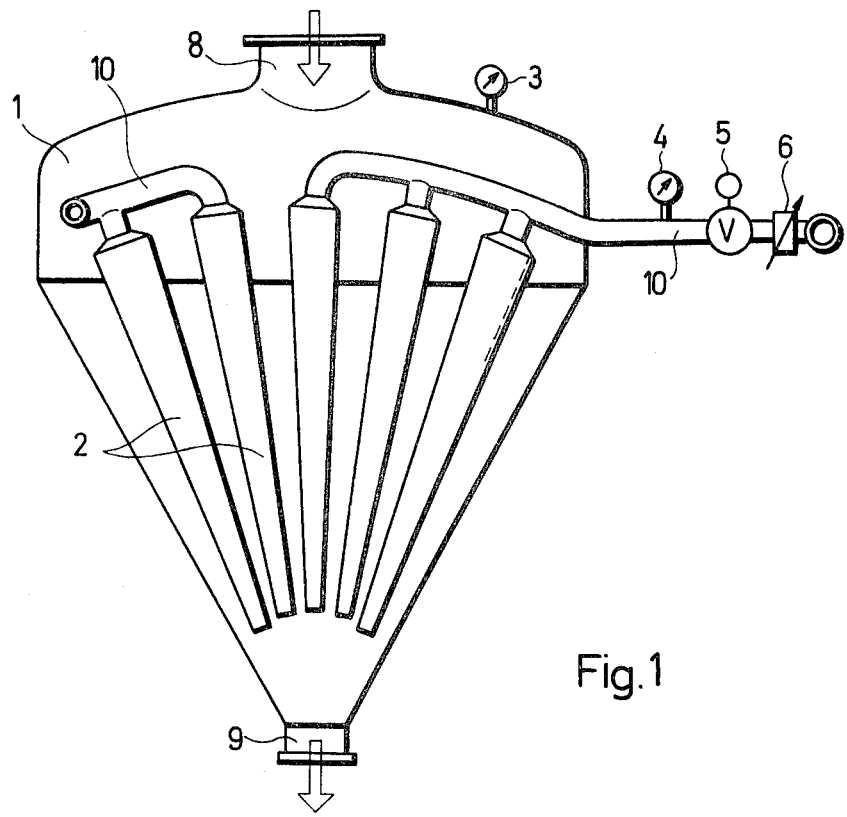
FIG. 1 shows a schematic, vertical cross-sectional diagram of plant according to the invention.
Figure 2:
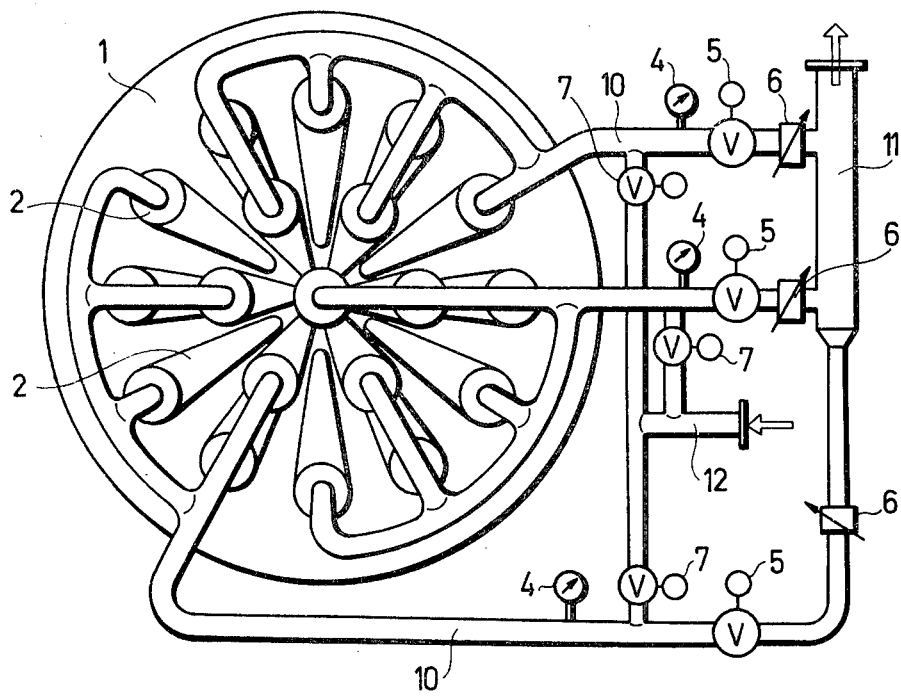
FIG. 2 is the schematic plan of the same plant.

The conceptual structural design of the plant is shown in FIGS. 1 and 2. Its design makes possible on the one hand the self-purification already described, on the other hand the flushing back group by group — though either self-purification or flushing back group by group would be itself be sufficient to bring about the continuous operation of this invention. It is seen from FIGS. 1 and 2 that the casing or housing 1 is conically tapered and the slurry passes through this along the axis. The entry port 8, which is designed for the total amount of the slurry streaming downward, is positioned at the upper part of the conical housing having a larger diameter. The exit port 9, whose size corresponds to the amount of concentrated slurry, is at the narrow end, i.e. the bottom.

The tubular filter elements 2 positioned inside housing 1 have filter surfaces formed on their respective conical or cylindrical surfaces. FIGS. 1 and 2 show conical filter elements, while in FIG. 3 three groups of filter elements are diagrammatically designated by a mere circle each. The bottoms of the filter elements are sealed, while on the top they are connected to the outlet tube system for filtered water 10. A vertical position is adopted for the filter elements and housing 1 in accordance with the operating principle, but other orientations may be adopted if required.

The area of the filter surface, their material and fineness as well as the shape and size of housing 1 depends on the special circumstances of the operation. Important is only that the liquid should stream along the filter elements 2, i.e. parallel to the filter surfaces with sufficient pressure and at such a speed that solid material should be prevented from depositing on the filter surfaces as far as possible or any deposited material should be washed off by the slurry. The concentrated slurry leaves through outlet 9, while the pure water is drained off through the tube system 10. While the slurry itself streams along the filter surface, the pure water leaving the slurry moves perpendicular to it into the inside of the filter element.

The material of the filter surfaces may be textile-, synthetic-or wire-cloth, ceramics of appropriate porosity, metal, plastic, any combination of these or other suitable material. Their porosity is not rigidly predetermined, it is adjusted according to the actual problem at hand.

The design with the conical elements in a conical condensing-tank shown in the figures is suitable for reaching a practically constant speed on the outside of the filter surfaces. This design is advantageous, because a uniform speed distribution ensures uniform conditions. The self-purifying of the filter surfaces may be achieved with the filter elements having a different, for instance cylindrical, shape and the condensing-tank having a different shape also. A nearly uniform speed distribution may be realised for instance in a stepwise narrowing housing using cylindrical filter elements whose diameter changes stepwise. In this case the operation requires of course that the lowest speed occuring should reach the value necessary for self-purification.

Should deposition take place on the filter surfaces for any reason this will increase the speed of the slurry in the housing which in turn increases the purifying effect and so the self-purification tends to maintain itself. In other words the self-purifying process regulates itself.

Apart from the self-purifying process a flushback system during continuous operation is also available for maintaining the filter surfaces clean, in which the outlets of the filter elements are connected together in groups and the number of elements in each group is, roughly equal.

The invention may be realised, however, also by using fewer filter elements which can be cleaned singly independently of one another. The word "group" must therefore be understood in the present description and in the claims as having one or several members.

Figure 3:
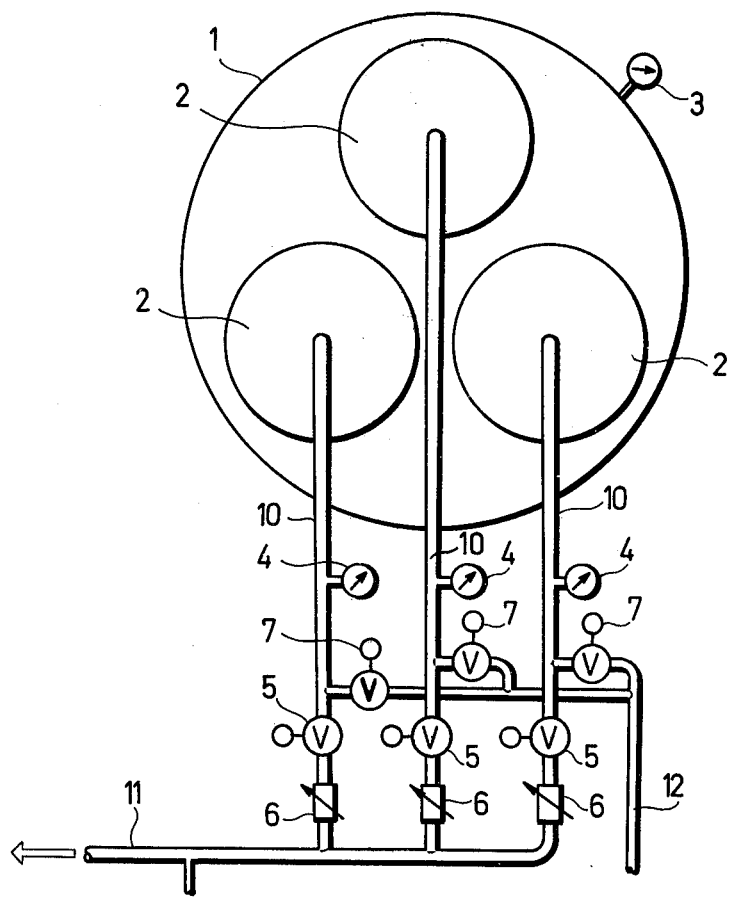
FIG. 3 shows a schematic switching diagram of the tube system necessary for back-flushing group by group.

Three such groups are shown are in FIGS. 2 and 3 which have been created by connecting together neighbouring elements — though the fact that they are neighbours is not a necessary requirement in the formation of the group. The clean liquid passing through the filter surfaces of the elements belonging to one group pass into the group-outlet. The putlets go through stop-valve 5 and ratemeter 6 into the common manifold 11.

The purity or degree of blockage of the filter surfaces of individual groups is checked during operation by measuring the resistance of the filter surface and the amount of liquid passing through simultaneously. The former is obtained as the difference between the reading of the pressure-gauge 3 attached to housing 1 and of the pressure-gauge 4 attached to the group-outlet, while the latter is observed as the reading of the ratemeter attached to the group-outlet. The resistance of the filter surface is characteristic of its degree of blockage, so the parameters determining the need for purification may be fixed and the beginning and completion of the purification may be automated.

The equipment for purification has been designed in recognition of the need for a fluctuating stream of liquid for a fast and efficient purification of the filter surfaces by flushing back, i.e. for the shock effect of momentarily large quantities used repeatedly over a comparatively short period of time. Therefore in the containers used for flushing back not shown in the figures, the pressure maintained is higher than the operating pressure in the slurry condenser. The pressure difference between the container and the condenser is the pressure necessary for the purification of the filter surfaces, the so called flush-back pressure. Fluctuation of the flush-back pressure may be achieved for example by having air at high pressure over the water in the container mentioned. Thus a quick release of water results in a sudden drop of pressure whereafter the container is repressurized and so on.

If, due to blockage of one of the groups, the ratemeter 6 indicates a decrease in the amount of clear liquid and the pressure difference between the gauge of the condenser 3 and that of the group in question 4 increases, then the stop-valve 5 of the relevant group is shut off and subsequently valve 7 is opened connecting the relevant group with the flushing manifold 12. All these and all subsequent operations carried out during flushing back may be carried out fully or partially automatically — the parameters measured suffice for this.

The group to be purified is connected by this operation to the flushing manifold 12 coming from the flushback container — but at the same time the other two groups continue to filter undisturbed. During the pulse-like purification therefore the material passing through outlet 9 consists on the one hand of slurry condensed by the filtration of two groups and on the other hand of solid material coming loose at the same time due to the purification, i.e. flush-back of the third filter element. An advantage of this procedure is that the material coming off during the purification of the filters requires no further treatment unlike in the cases of plants known to date.

After the effective and quick flush-back using pulse-like purifying cycles following one another, valve 7 of the relevant group is shut off and stop-valve 5 is opened up putting the purified group back into operation.

Figure 4:
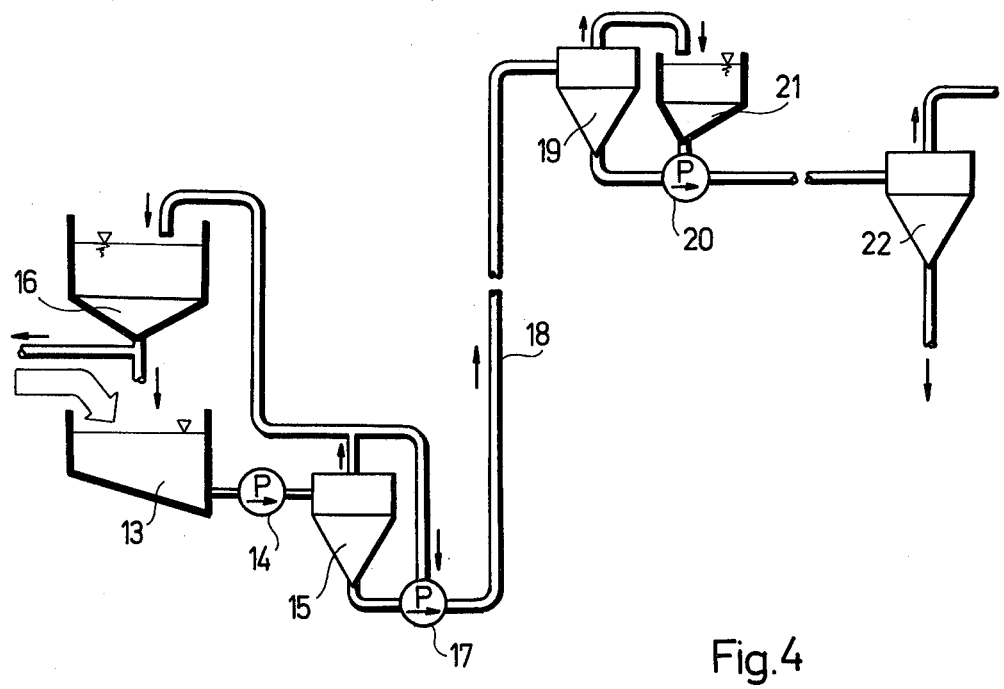
FIG. 4 shows several plants designed according to this invention connected in series for use with a multi-stage hydraulic conveyor.

FIG. 4 shows the application of the slurry condenser plant of this invention to a multistage hydraulic conveyor. In this way the slurry condenser may play an important role in hydraulic conveyors operating over longer distances or using higher pressures — quite apart from the wide area represented by the industrial uses there are applications in preparation and water purification technologies. The economy of the application of such conveyors is made unfavourable in many instances by the fact that the slurry leaving the producing or other technological plant is too dilute and in the case of transportation through pipes the conveying of the liquid phase causes extra cost.

The slurry condenser changes these conditions. FIG. 4 shows that in the case of a slurry whose concentration is lower than optimal for transportation the stream of slurry lifted out of slurry basin 13 by slurry pump 14 is passed through slurry condenser 15 which filters out the excess liquid which would be unnecessary and disadvantageous in transportation. This liquid is led into basin 16 in a state of readiness for recycling into the manufacturing process. In this way on the one hand the amount of unnecessary water is decreased, on the other hand a way is opened for the balancing out of the fluctuation of the slurry stream coming from the technological plant without recourse to an external liquid supply by passing some liquid from basin 16 into the slurry reservoir 13.

The concentrated slurry, whose concentration corresponds now to that needed for economical transportation, is led into the pump /or feedtank 17.

These have the property in general of diluting the entering slurry to a greater or lesser extent; in the case of a slurry pump the excess liquid is coming from flushing the aperture or the packing box, while in the case of cyclic feeding apparatuses it is derived from other flushing processes. The application of the slurry condenser eliminates the excessive diluting effect of these flushing waters. The extent of concentration is so chosen that optimal dilution is obtained after they return to the slurry after flushing. A further advantage is that the flushing water need not be taken from an external source but may be taken from the slurry itself.

The figure shows a multistage hydraulic conveyor wherein the height and distance parameter of the transportation exceeds that which may be bridged in one step. A further condenser 19 at the end of the pipe 18 connecting to pump 17 may produce an advantageous solution. The transloading apparatus 20 can be connected direct to the transporting pipeline, even in the case of longer distances or greater heights. In general this has not been possible up to now because one could not ensure uniformity of flow in the two pipe sections. Condenser 19 on the other hand may take up on the liquid side any excess quantity due to fluctuation in the incoming stream and channel it into the transitional watertank 21. Thence it may be added into the transloading apparatus 20 as required for balancing out the fluctuations in the stream in the second pipe section connected on.

In this way the procedure generally followed at transloading stations can be avoided whereby an open slurry storage tank is built between the first and the second pipe sections. The condenser 18 provides at the same time the necessary flushing water supply for the transloading apparatus 20 without the need for an external water supply.

Condenser 22 at the receiving station at the end of the pipeline concentrates the slurry to the maximum value technologically possible. This makes a small size possible for the apparatus necessary for separating the solid and liquid phase, whose size depends on the amount of material passing through. This reduces considerably the capital investment.

According to the above description pump 17 and in general the pressure increasing apparatuses at every stage of the entire plant, needed for transporting the liquid, are so connected that their low-pressure parts are connected to the outlet of a filter apparatus and their flushing water is supplied from the clean water outlet of the same filter apparatus. The advantage of this solution is that it makes the continuous flow of the slurry and of the clean filtered water possible and there is no need therefore the remove the slurry from the flow and to store it in a storage tank.

What we claim is:

1. An apparatus for filtering slurry composed of a mixture of water and solid components, comprising a housing having an inlet, a first outlet spaced lengthwise of said housing from said inlet, a second outlet, and an inner circumferential wall extending in direction from said inlet to said first outlet; a plurality of hollow filter elements in said housing, each filter element extending in the direction from said inlet towards said first outlet, the exterior surfaces of the filter elements bounding together with said inner circumferential wall of said housing to form a flow passage the cross-sectional area of which decreases in the direction from said inlet towards said first outlet, the interior of each filter element communicating with said second outlet, said flow passage of decreasing cross-sectional area communicating with said first outlet so that the flow speed of said slurry along said filter direction towards said first outlet is at least substantially constant; and means for passing a slurry from said inlet through said flow passage to said first outlet of said housing in substantial parallelism with and in contact with the exterior surfaces of said filter elements, so that part of the liquid component of said slurry in said flow passage passes through the exterior surfaces of said filter elements into said filter elements for evacuation through said second outlet, whereas the remaining densified slurry passes substantially parallel to and in contact with the exterior surfaces of said filter elements to said first outlet and thereby continuously dislodges from the exterior surfaces of the filter elements the solid component which attempts to deposit thereon.

2. An apparatus as defined in claim 1; wherein said filter elements are arranged in groups; and further comprising means for back-flushing each of said groups independently of every other group.

3. An apparatus as defined in claim 1, further comprising a filtrate outlet conduit communicating with said second outlet; a pressure gauge in said outlet conduit for indicating the filtrate pressure; and a flow-rate meter in said outlet conduit for indicating the filtrate flow rate.

4. An apparatus as defined in claim 1, wherein the cross-sectional area of said inner circumferential wall of said housing decreases in the direction from said inlet to said first outlet.

5. An apparatus as defined in claim 4, wherein said inner circumferential wall of said housing is conically convergent.

6. An apparatus as defined in claim 1, wherein the cross-sectional area of said filter elements decreases in the direction from said inlet to said first outlet.

7. An apparatus as defined in claim 6, wherein said filter elements are conically convergent in the direction from said inlet to said first outlet.

8. An apparatus as defined in claim 1, wherein the cross-sectional area of both said inner circumferential wall of said housing and of said filter elements decreases in the direction from said inlet to said first outlet.

9. An apparatus for filtering slurry composed of a mixture of water and solid components, comprising a housing having an inlet, a first outlet spaced lengthwise of said housing from said inlet, a second outlet, and a generally conically-shaped inner circumferential wall which decreases in cross-sectional area in direction from said inlet towards said first outlet; a plurality of hollow filter elements in said housing, each filter element having a generally conically-shaped filter surface which converges in direction from said inlet towards said first outlet, each filter surface of a respective filter element bounding together with said inner circumferential wall of said housing a flow passage the cross-sectional area of which decreases in direction from said inlet towards said first outlet, the interior of each filter element communicating with said second outlet; and means for circulating a slurry from said inlet through said flow passages to said first outlet of said housing and along and in substantial parallelism with said filter surfaces of said filter elements, so that part of the liquid component of said slurry in said flow passages passes through said filter surfaces into said filter elements for evacuation through said second outlet, whereas the remaining slurry passes along said substantially parallel to said filter surfaces towards said first outlet and continuously dislodges from said filter surfaces the solid component which attempts to deposit thereon in response to the passage of water into said filter elements.

10. A method of concentrating a slurry comprised of water and solid particles without substantial accumulation of deposited solid particles on the exterior surfaces of hollow filter elements by passing the slurry into a filter apparatus comprising a housing having an inlet, a first outlet spaced lengthwise of said housing from said inlet, a second outlet, and an inner circumferential wall extending in the direction from said inlet to said first outlet; a plurality of hollow filter elements in said housing, each filter element extending in the direction from said inlet towards said first outlet, the exterior surfaces of the filter elements bounding together with said inner circumferential wall of said housing to form a flow passage the cross-sectional area of which decreases in the direction from said inlet towards said first outlet, the interior of each filter element communicating with said second outlet, said flow passage of decreasing cross-sectional area communicating with said first outlet, the method comprising passing the slurry through a flow space of decreasing cross-sectional area defined between the inner circumferential wall of a housing and the exterior surfaces of a plurality of hollow filter elements which extend in the direction of flow of the densified slurry and removing water from the densified slurry flowing through said flow space by causing the water to pass through the exterior surfaces of the hollow filter elements into the interiors thereof, using a flow space whose cross-sectional area decreases at such a rate that the densified slurry flowing through said flow space flows along the length of and in contact with the exterior surfaces of the filter elements at a speed which is at least substantially constant, whereby the densified slurry flowing along the exterior surfaces of the filter elements continually washes off solid particles tending to accumulate on the exterior surfaces of the filter elements.

* * * * *